United States Patent [19]

Rhoades et al.

[11] Patent Number: 5,455,488
[45] Date of Patent: Oct. 3, 1995

[54] MINIATURE LIGHT-ACTIVATED LAMP CONTROL APPARATUS AND THE LIKE

[75] Inventors: David P. Rhoades; Christopher S. Paul, both of San Francisco; Edward M. Buckley; David M. Barton, both of San Jose; Claude A. S. Hamrick, Los Gatos, all of Calif.

[73] Assignee: CMC Technologies, Inc., San Francisco, Calif.

[21] Appl. No.: 188,402

[22] Filed: Jan. 28, 1994

[51] Int. Cl.⁶ .............................. H05B 37/00; G02B 6/00
[52] U.S. Cl. ................ 315/156; 315/159; 315/151; 315/157; 250/239; 250/214 AL; 250/227.11
[58] Field of Search ...................... 315/151, 156, 315/157, 158, 159, 150; 250/239, 214 AL, 227.11, 227.14

[56] References Cited

U.S. PATENT DOCUMENTS

| | | | |
|---|---|---|---|
| 2,123,470 | 7/1938 | Lamb | 250/214 AL |
| 3,093,744 | 6/1963 | Tabet | 250/214 AL |
| 3,421,013 | 1/1969 | Angelari | 315/158 |
| 3,621,269 | 11/1971 | Misencik | 250/239 X |
| 3,900,763 | 8/1975 | Turner | 315/156 |
| 4,023,035 | 5/1977 | Rodriguez | 315/159 |
| 4,568,826 | 2/1986 | Pitel et al. | 250/237 R |
| 4,588,926 | 5/1986 | Pezzolo | 315/155 |
| 4,907,139 | 3/1990 | Quiogue | 250/239 |
| 4,988,921 | 1/1991 | Ratner et al. | 315/159 |
| 5,235,252 | 8/1993 | Blake | 315/151 |
| 5,272,418 | 12/1993 | Howe et al. | 315/159 |

Primary Examiner—Benny Lee
Assistant Examiner—Arnold Kinkead
Attorney, Agent, or Firm—Claude A. S. Hamrick

[57] ABSTRACT

Miniature light-activated lamp control apparatus and the like, including a thin disk-shaped switching unit positionable within a light bulb socket and a thin light conductor having one end attached thereto, the light conductor being extendable through the gap between the electrically conductive inner wall of the socket and the electrically conductive outer surface of the bulb base disposed in the socket, and terminating at the opposite end in a lens for gathering ambient or other light. The switching unit has a first contact on one side for engagement with the socket center terminal, and a second contact on an opposing side for engagement with the center terminal of a light bulb. The unit includes a thin circuit board having control circuitry mounted thereon, such circuitry being positioned to occupy available space between the conical bulb base and the circuit board. Also mounted on the circuit board and in light communication with the light conductor is a photodetector electrically coupled to the control circuitry. The control circuitry receives operating power from the lamp through the first contact and is responsive to light communicated through the light conductor to turn the power to the second contact OFF and ON. The circuitry also has provision for gradually applying the power to the bulb (slow start) to extend bulb life, and has a hysteresis response to the incoming light intensity so as to eliminate turn-ON and turn-OFF flicker.

28 Claims, 8 Drawing Sheets

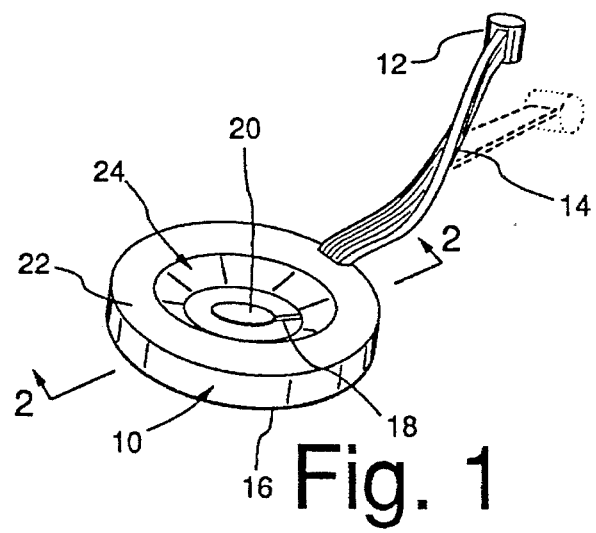
Fig. 1
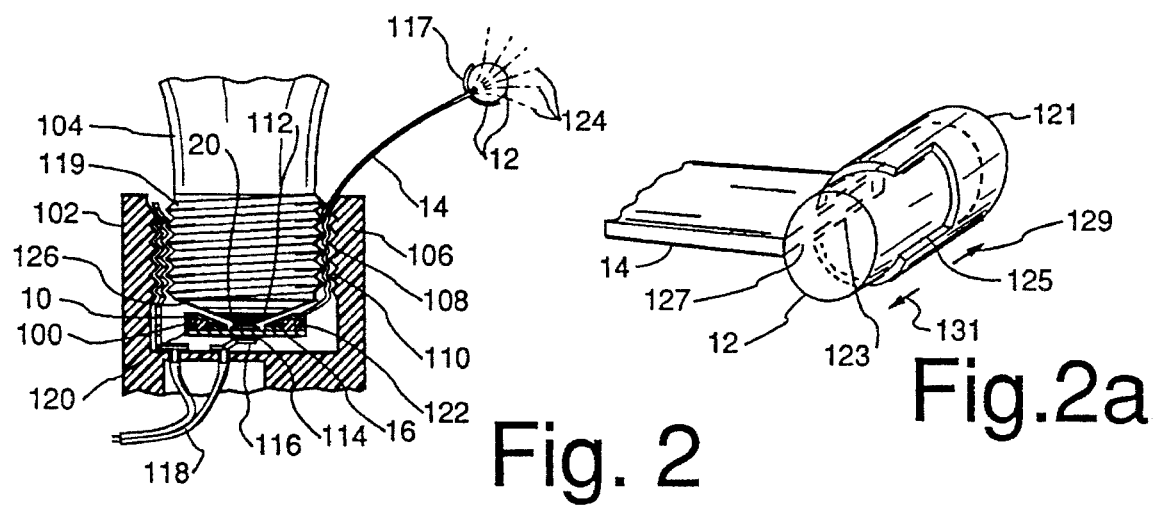
Fig. 2
Fig. 2a

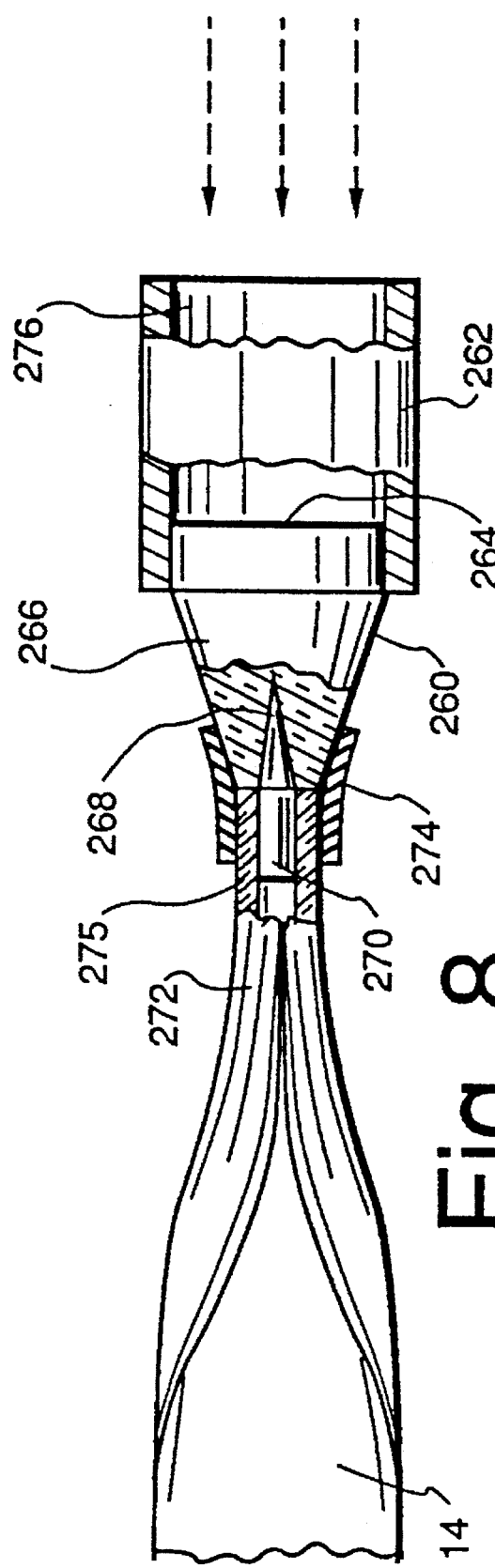
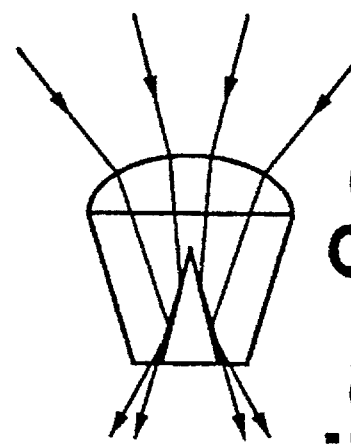
Fig. 8
Fig. 8a

MINIATURE LIGHT-ACTIVATED LAMP CONTROL APPARATUS AND THE LIKE

BACKGROUND OF THE INVENTION

1. Field of the Invention

The present invention relates generally to photo-sensitive, light-activated switch apparatus responsive to ambient or other light conditions for turning ON and OFF electric devices, and more particularly to a switching device of a configuration suitable for location within a light socket and having an external light collector and flexible conduit for conducting light from the light collector to the switching device.

2. Brief Description of the Prior Art

There has long been a need for apparatus that can be used to turn conventional lighting fixtures ON and OFF as a function of ambient light conditions. For example, in the home environment various forms of such apparatus have been used exteriorly of the house to light porches, walks and driveways, and in the interior as a means to ward off potential unauthorized intruders during evening hours. The prior art has addressed this problem by providing bulky "piggy-back" light bulb receptacle devices for receiving a bulb and for carrying suitable daylight-responsive switching apparatus. The devices are adapted to screw into the light fixture socket with the bulb then being screwed into the device. However, such devices are not usable in some types of fixtures and are awkward to use in other types of fixtures.

U.S. Pat. No. 4,023,035 to Rodriquez discloses a device of the type described above, which includes a housing containing a light sensor and responsive switch apparatus to turn the light OFF and ON with ambient light conditions. The housing has a threaded portion for joining the lamp socket and an opposing socket to receive the bulb. The result is a significant displacement of the bulb position relative to the original lamp socket. This is a disadvantage because many lamp shade brackets and/or enclosures are not designed with enough clearance to accommodate the added length. Also, the location of the sensor inside the shade limits its effectiveness in detecting the ambient light. Furthermore, such apparatus is not available or even practical for use in the smaller candelabra style fixtures.

Pezzolo, U.S. Pat. No. 4,588,926 discloses a nightlight circuit which overcomes the flicker of previous automatic turn-on circuits using a photo-electric eye. Flicker is prevented by mounting a second photosensor in parallel with a portion of the voltage divider including the first electric eye to short out a portion of the voltage divider in response to the light turning on.

Other prior art U.S. Patents of general interest include Bernheim (U.S. Pat. No. 3,056,035), Bernheim (U.S. Pat. No. 3,163,768), Shepard (U.S. Pat. No. 3,341,711), Berlin (U.S. Pat. No. 3,538,379), and Pitel et al. (U.S. Pat. No. 4,568,826). These patents disclose related useful apparatus, but do not disclose or suggest a device that can be easily integrated into an existing lamp structure without significantly displacing the bulb.

As to other patented prior art, Ratner et al. (U.S. Pat. No. 4,988,921) discloses an apparatus including a sealed lamp (light bulb) assembly having a built-in photo sensitive switch. A disadvantage of this approach is the costly necessity of throwing away the photo switch when the bulb burns out.

Johnson in U.S. Pat. No. 5,030,890, although not disclosing an ambient light responsive unit, does disclose a means for gradually applying power to a bulb, implemented in a disc shaped apparatus that is installed in the lamp socket beneath the bulb. A disadvantage of the device is that it displaces the bulb to an extent requiring the use of an insulating ring to cover exposed bulb threads.

There thus still remains a need for a small, universally acceptable device that incorporates the various necessary features in a way that does not detract from the functional and/or aesthetic aspects of lamp fixtures in general.

SUMMARY OF THE INVENTION

It is therefore an object of the present invention to provide a light-activated switch which can be inserted into an electrical connection, such as a lamp socket, and used to automatically make or break the electrical path as a function of a predetermined light condition.

Another object of the present invention to provide a light activated switch responsive to ambient lighting and which can be incorporated into a conventional lamp in a way that does not materially displace the bulb.

A further object of the present invention is to provide a light activated switching device that can be positioned in a bulb-receiving socket between a bulb and a corresponding socket terminal and which includes a light collector that can be extended from the socket without interfering with the normal relationship of bulb and socket.

Another object of the present invention is to provide a novel light-activated switch of the type described that does not significantly alter the lamp's aesthetic design.

A still further object of the present invention is to provide a light activated switch positionable between a bulb and a corresponding socket that also includes other useful features.

Briefly, a preferred embodiment of the present invention includes a thin disk-shaped switching unit positionable within a light bulb socket and a thin light conductor having one end attached thereto, the light conductor being extendable through the gap between the electrically conductive inner wall of the socket and the electrically conductive outer surface of the bulb base disposed in the socket, and terminating at the opposite end in a lens for gathering ambient or other light. The switching unit has a first contact on one side for engagement with the socket center terminal, and a second contact on an opposing side for engagement with the center terminal of a light bulb. The unit includes a thin circuit board having control circuitry mounted thereon, such circuitry being positioned to occupy available space between the conical bulb base and the circuit board. Also mounted on the circuit board and in light communication with the light conductor is a photodetector electrically coupled to the control circuitry. The control circuitry receives operating power from the lamp through the first contact and is responsive to light communicated through the light conductor to turn the power to the second contact OFF and ON. The circuitry also has provision for gradually applying the power to the bulb (slow start) to extend bulb life by significantly reducing the inrush current, and has a hysteresis response to the incoming light intensity so as to eliminate turn-ON and turn-OFF flicker.

An important advantage of the present invention is that its small size and design results in substantial "transparency" when in use with lamps.

Another advantage of the present invention resides in its physical and mechanical simplicity, and low cost.

A further advantage of the present invention is its ease of installation and use.

A still further advantage of the present invention is its inclusion of slow start, hysteresis, and over-temperature features along with its ability to turn a bulb ON and OFF in response to a predetermined level of ambient light.

Yet another advantage of the present invention is that it can include optional features such as the ability to time-out after a predetermined period of operation to save electricity, and the capability of being remotely disabled by the momentary interruption of power applied thereto.

Still another advantage of the present invention is that it may be used to control electrical devices plugged into an electrical receptacle inserted into a socket.

Yet another advantage of the present invention is that it may be used as a means for facilitating the remote activation or deactivation of an electric device using either a directional light beam or a long length of optical cable.

IN THE DRAWINGS

FIG. 1 generally illustrates a preferred embodiment of the present invention;

FIG. 2 is a generalized cross-section taken along the line 2—2 of FIG. 1 and illustrates the relationship of the subject invention to a lamp socket and light bulb;

FIG. 2a illustrates a means for selectively adjusting the amount of light admitted to the lens of FIGS. 1 and 2;

FIG. 8 illustrates a directional light-admitting shroud and an alternative lens configuration.

FIG. 8a illustrates a condenser having a hemi-spherical or convex base.

DETAILED DESCRIPTION OF THE PREFERRED EMBODIMENTS

Figure 3:
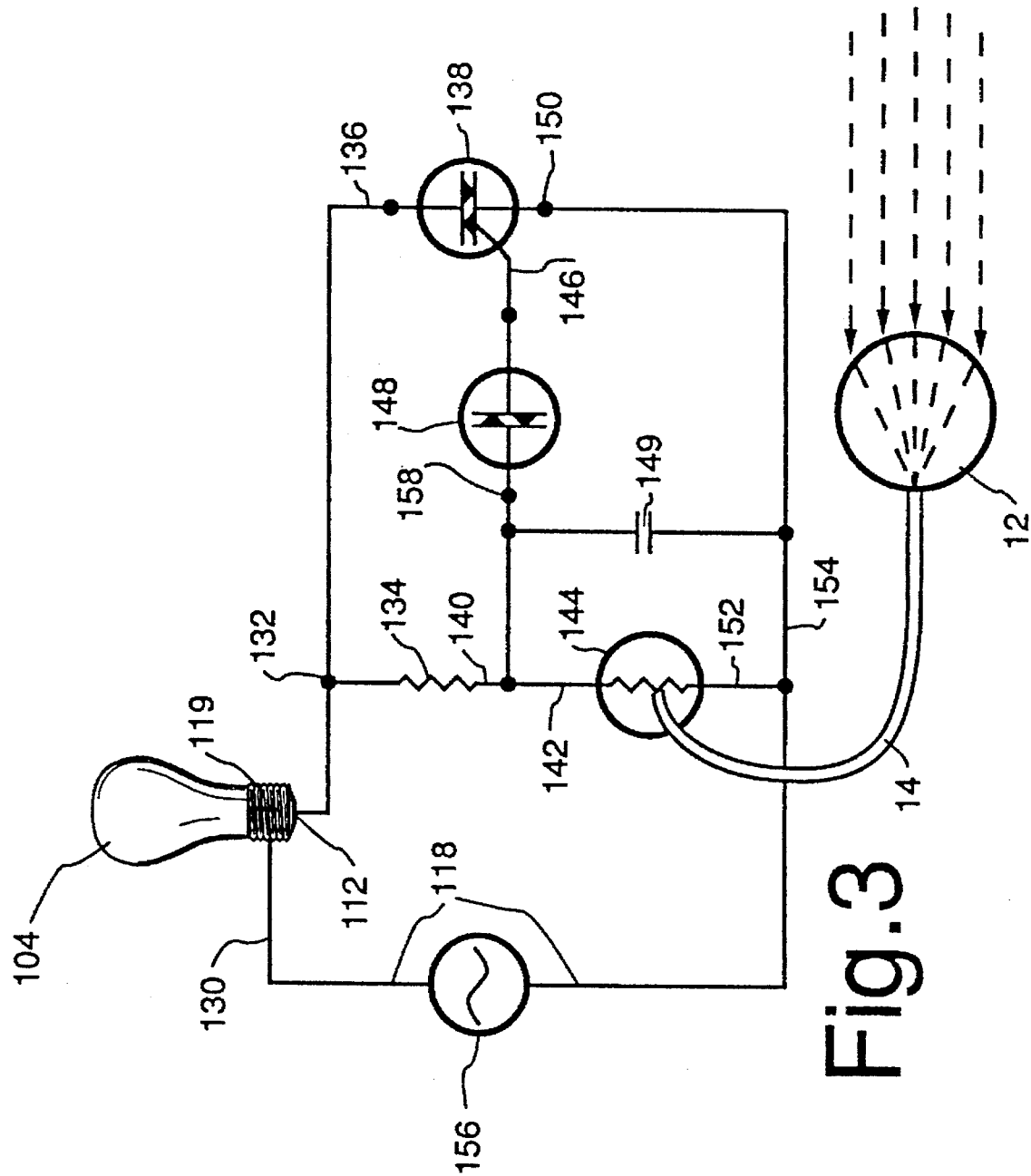
FIG. 3 is a simplified schematic of an assembly in accordance with the present invention for turning a light ON and OFF as a function of light conditions.

Referring now to FIG. 1 of the drawing, a preferred embodiment of the present invention is shown to include a disk-shaped switching unit 10 and an ambient light collecting lens 12 interconnected by a thin, flat, flexible fiber optics cable or light-conducting ribbon 14. The switching unit 10 is essentially comprised of a thin circular printed circuit board 16 upon which are formed conductive traces 18 and others (not shown) which, as will be described below, connect an upper contact pad 20 and a lower contact pad (not shown) with switching circuit components disposed around the perimeter of the board and covered by a cap 22 or a suitable deposit of encapsulating material.

The diameter of unit 10 is selected to be small enough to fit into the type of light socket with which the device is intended to be used. For example, for standard light fixtures the diameter might be on the order of 0.950 inch, whereas for candelabra or carriage light fixtures and the like the diameter might be approximately 0.375 inch. The recessed region 24 on the top of the unit is made large enough to accommodate the center contact structure of the bulb type with which the device is intended to be used. Contact pad 20 and the lower contact pad on the bottom side of unit 10 are made of a suitable conductive material and size to assure good ohmic contact with a bulb contact and socket center contact respectively. Their thickness is also made as thin as practical so that the combined thickness of the two contacts and the separating circuit board are as small as possible. Note that it is this thickness which determines the height to which the bulb is lifted in its socket with the subject device in use. In practice it is desirable that the thickness be no greater than 0,025 inch.

The light collector 12 is a cylindrical lens or other light-collecting means suitably affixed to one end of the cable 14 and operable to focus ambient or other light into the end of the cable 14. The opposite end of cable 14 extends into the cap 22 where, as will be described below, it interfaces with a suitable light sensor or detector. The cable may be of any length varying from just long enough to extend out of the socket to several times that length so that the lens can be placed in a position to have optimum exposure to ambient or other light. Furthermore, the light-collecting lens and ribbon cable can be fabricated as an integral unit having any configuration suited to fit a particular application.

In FIG. 2 of the drawing, the embodiment of FIG. 1 is shown at 100 in section and disposed in a similarly sectioned lamp socket 102. As indicated, the unit 10 is positioned in the bottom of socket 102 with its fiber optics cable 14 extending out of the socket by passing between the bulb 104 and the socket wall 106. As previously mentioned, the cable 14 is flat, thin and flexible enough to conform to the clearance 108 between the threaded conductive inner sleeve 110 of socket 102 and the threaded, conductive sleeve portion 119 of the bulb 104. It is preferably coated with an opaque, lubricous or slippery coating so as to (1) reduce light intrusion and (2) minimize friction upon engagement with the bulb portion 119 as the bulb is screwed into the socket.

However, it will be understood that for applications in which the bulb is not screwed into a threaded socket, the ribbon cable need not necessarily be highly flexible. It must just be thin enough to pass between the bulb and socket wall. The cylindrical lens 12 at the end of cable 14 is positioned so that it accepts and focuses ambient or other light, indicated by the dashed lines 124, into the end of cable 14, but does not collect light from the bulb 104. The lens 12 may also be partially coated with a suitable light-blocking opaque material 117. By making the material removable by scratching, such coating can also be used as a means for selecting the level of light required to trigger the switching unit 10.

Alternatively, a slidable sleeve or otherwise removable or adjustable shade or cover could also be provided. One such shade is shown in FIG. 2a in the form of a cylindrical sleeve 121 telescopically fit over the cylindrical lens 12. The shade has a slot 123 cut in the back side to slip over the light-conducting ribbon 14, and a notch 125 provided in the front side to admit light to the lens 12 for focus onto ribbon edge 127. To admit more light to the ribbon 14 the shade would be moved in the direction of the arrow 129, and to reduce the input light the shade would be moved in the direction of arrow 131.

The unit 10 is shown to have its upper contact 20 in engagement with the center contact 112 of the bulb 104, and its lower contact 114 in engagement with the resilient spring terminal 116 of socket 102. Note that AC electrical power that is normally supplied through line cord 118 and applied to the bulb 104 via the conductive sleeve 110 and terminal 116 now passes through unit 10 to bulb contact 112 via contact 114, the switching circuitry mounted to board 16 and including integrated circuit devices shown generally at 120 and 122, and upper contact 20.

As suggested above, the circuit board 16 and contacts 20 and 114 are made thin enough so as to cause only minimal vertical displacement of the bulb from its normal operating position. As a consequence, the bulb 104 and conductive bulb sleeve 119 will be caused to extend out of the socket very little more than they normally do. Furthermore, the electrical components 120 and 122 mounted on the board 16 are configured and positioned to occupy the otherwise unoccupied space between the board and the tapered bottom 126 of the bulb.

Although the unit 10 is depicted as being disk-like and circular in configuration with its contacts centrally located, it is contemplated that there may be other applications in which the contacts might be placed at locations other than the center of the circuit board. Such alternative is believed to be within the scope of the present invention.

FIG. 3 is a simplified schematic showing the electrical components and their interconnection for a basic switching circuit incorporating light-sensing components in accordance with the present invention. A first conductor 130 of the line cord 118 is shown connected to the outer sleeve 119 of the bulb 104. The bulb's center terminal 112 is connected at 132 to one side of a resistor 134 and to a first terminal 136 of a TRIAC 138. The other side 140 of resistor 134 and one terminal 142 of a photocell 144 are connected to the gate 146 of TRIAC 138 through a DIAC 148. A capacitor 149 is connected across the photocell 144. The third terminal 150 of the TRIAC is connected to the other side 152 of photo cell 144 and to the second conductor 154 of the line cord 118.

In operation, power supplied to the line cord 118 from an AC source 156 is impressed across the series connected bulb 104 and TRIAC 138. In the absence of sufficient light falling on photocell 144, such as when the input light is low, the photo cell has the characteristic of a high resistance and the resistor 134 and photo cell 144 form an AC voltage divider network so that the voltage at the DIAC terminal 158 is highest when the resistance of the photo cell 144 is highest. The values of photo cell 144 and resistor 134 are selected so that in this condition the DIAC 148 "fires", delivering a pulse of current to the TRIAC gate 146 causing the TRIAC to conduct current to the center terminal 112 of the bulb 104 causing the bulb to operate normally.

On the other hand, when the ambient or other input light is high, the lens 12 and fiber optics tube 14 supply enough light to the photo cell 144 to cause the resistance thereof to drop, and the voltage division properties of the capacitor 134 and cell 144 cause the voltage on the DIAC terminal 158 to be insufficient to fire the DIAC. Thus, the DIAC provides no pulse to the gate 146, and thereby keeps the TRIAC in an OFF state, effectively disconnecting the bulb 102 center terminal 112 from the line cord conductor 154.

Figure 4:
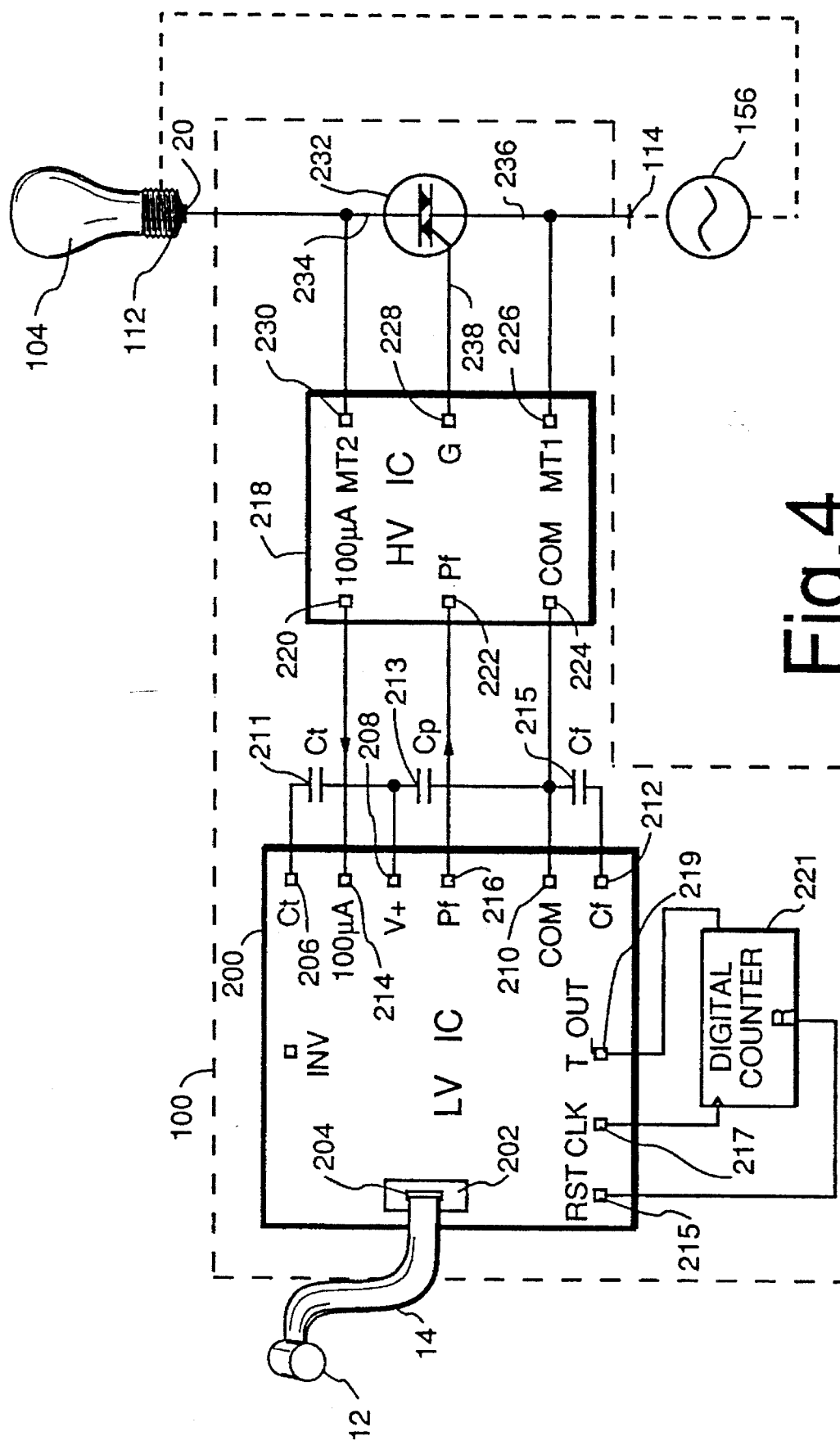
FIG. 4 shows a block schematic of an embodiment of the invention incorporating external capacitors, TRIAC and digital counter, and including separate low voltage (LV) and high voltage (HV) circuits.

In FIG. 4, a second embodiment of the present invention is shown in block diagram form to include a low voltage (LV) integrated circuit unit 200, with a photo cell symbolically illustrated at 202, and other circuitry to be more fully explained below. The photo cell may or may not be a part of the integrated circuit unit 200, depending on the particular design. Also shown is the light-conducting cable 14 with lens 12 for receiving light, and an additional lens 204 for optimizing the light incident on the photo cell. This optional lens may also be included in any embodiment of the present invention and may or may not be of the immersion lens type. Three capacitors Ct, Cp and Cf are connected between terminals 206 and 208, 208 and 210, and 210 and 212, respectively. Output terminal 216 and input terminal 214 are also provided. Terminals 215, 217 and 219 for an optional external digital counter 221 are also provided.

The circuit also includes a high voltage (HV) integrated circuit unit 218 having an output terminal 220 connected to terminal 214, an input terminal 222 connected to terminal 216, a terminal 224 connected to terminal 210, an output terminal 228, and power terminals 226 and 230. A TRIAC 232 has a first terminal 234 connected to terminal 230 and to the upper device contact 20 (FIG. 2), and a second terminal 236 connected to terminal 226 and to the lower device contact 114. The gate terminal 238 of TRIAC 232 is connected to terminal 228 of the HV circuit 218. In addition, the bulb 104 is shown with its center terminal 112 connected to upper device contact 20. The bulb's threaded sleeve 119 contacts the conductive sleeve 110 of the socket 102 (FIG. 2).

The LV circuit 200 responds to a predetermined level of light received from the fiber optics cable 14 to provide a drive signal at terminal 216 for input to HV terminal 222 to cause HV circuit 218 to stop current flow out of terminal 228 to the gate 238 to de-activate the TRIAC 232, thus causing cessation of current flow through the bulb 104. Should the light intensity level conducted through the optical cable 14 fall below a certain threshold, LV circuit 200 will generate an output at terminal 216 for input to terminal 222 to cause HV circuit 218 to provide a sufficient flow of current to the gate of the TRIAC through terminal 228 to activate the TRIAC and cause it to conduct and thereby supply line current to the bulb 104. HV circuit 218 also provides a rectified current from line voltage appearing at terminal 230, for supporting its internal functions and for supplying power to LV circuit 200 via terminals 220 and 214, the current return path being from terminal 210 to terminal 224.

LV circuit 200 also provides a "hysteresis" effect reducing the threshold of light required to cause the device to turn the bulb ON once the light intensity has increased to a level sufficient to cause the device to turn the bulb OFF. This hysteresis effect functions to eliminate flicker during ON and OFF transitions.

The LV circuitry 200 also provides a "slow start" function which causes the current in the bulb to rise gradually when turning ON, a function which extends bulb life. The slow start circuit is prevented from beginning its operation whenever the light intensity is higher than a predetermined limit, or when the chip temperature is too high. Using capacitor Cp and the supply current from terminal 220 of HV circuit 218, the LV circuitry produces operating voltage for its internal functions.

Figure 5:
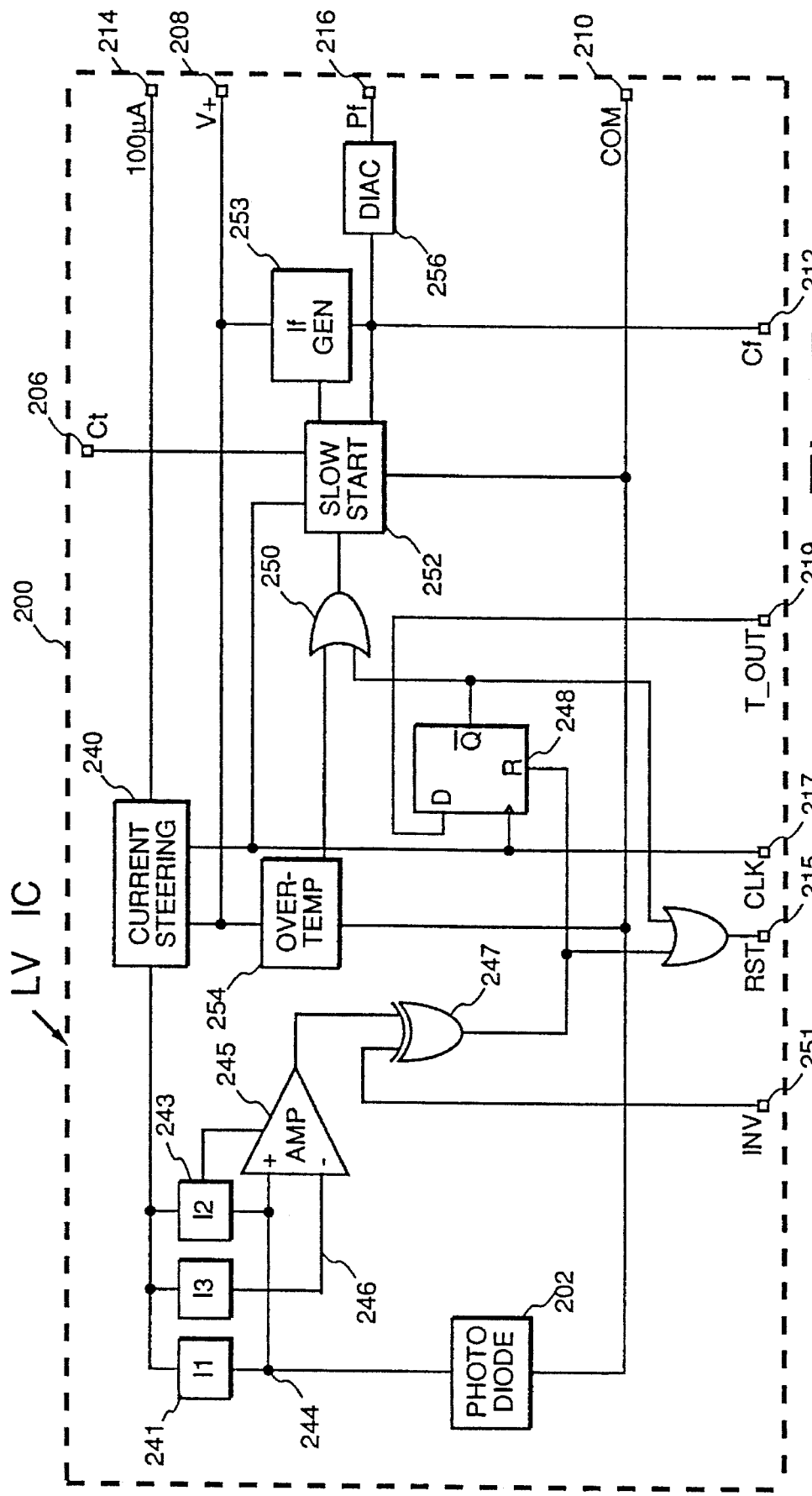
FIG. 5 is a block diagram showing the principal components of the LV circuitry of FIG. 4.

Referring now to FIG. 5, the principal components of the LV circuitry 200 are shown in more detail. The current steering block 240 acts as a diode driving the power supply filter capacitor Cp 213 (FIG. 4) via terminal 208, making DC operating voltage for the circuitry available throughout the AC line half-cycle; and provides a reset pulse for the phase-control circuit at AC line- voltage zero crossings.

Photo diode 202 conducts current in direct proportion to the light level transported to it by the fiber optics cable 14 (FIG. 4). Current sources I1 241 and I2 243 drive the photodiode 202. If the photo current is less than the sum of I1 241 and I2 243, the voltage on node 244 will be "high". When the photo current exceeds that sum, the voltage will drop almost to zero. Since both the photo diode and the current sources present extremely high impedances to the summing node 244, the voltage moves fast as the photo current swings through the current source value.

The current from I1 241 is constant, but when the voltage at node 244 falls below the reference voltage level on the other input to amplifier 245 (node 246), the amplifier acts as a comparator and switches its output to OFF. This reduces the light-level threshold, giving the system light-level hysteresis.

Amplifier 245 also drives, via logic including exclusive OR gate 247, flip-flop 248 and OR gate 250, the slow-start Timer 252, as does the Temperature Sensor 254. The Logic structures use standard "macros" provided by the IC processing facility, so their details may vary from one manufacturer to another. Only the logic function is relevant here, so the logic is represented only in block form.

Normal Mode of Operation

In the normal mode of operation the second input to the exclusive OR gate 247 is connected to common. Then if either the light level is too high, or the chip temperature is too high, or both, the circuit LOGIC prevents the slow-start Timer 252 from operating. If the slow-start Timer 252 is not disabled by too much light or too high a chip temperature, it begins its timing cycle and, if not interrupted by one of those conditions, reaches its terminal state in 120 ms (nominal). A constant current source drives the slow-start timing capacitor, Ct, 211 (FIG. 4) producing a voltage proportional to elapsed time. This voltage controls the If Gen 253 such that its output current increases continuously during the timing cycle. This current, in turn, charges capacitor Cf 215 (FIG. 4). But the circuit resets the voltage on Cf via the slow-start Timer's discharge terminal, at the beginning of each AC line voltage half-cycle.

The DIAC circuit 256 fires whenever the voltage on capacitor Cf 215 (FIG. 4) reaches approximately 19 volts. The time the voltage takes to reach the firing point varies inversely with the capacitor's charging current. Thus, at the start of the slow-start Timer cycle, when charging current is low, the DIAC 256 fires late in the cycle, producing low average lamp voltage. As the slow-start cycle proceeds, the firing delay diminishes, and when the slow-start Timer reaches its terminal value, delay is negligible, giving the lamp almost the full AC line voltage.

Inverse Mode of Operation

When a wire on the bonding pad 251 to the second input of the exclusive-OR gate (2) is connected to V+(instead of Common), the circuit operates in Inverse mode, so that the circuit activates the light when the sensed light level rises above the device threshold. This is useful in certain applications, such as the inside light of a garage. When the user opens the garage door, the car headlights (or the sun) activate the device, turning on an inside light, which stays on for a predetermined length of time. The exclusive-OR gate 247 accomplishes this by inverting the output signal from amplifier 245. In Inverse mode, the effect of excessive chip temperature is not inverted; the circuit still turns the light OFF if chip temperature exceeds a predetermined limit.

Figure 7:
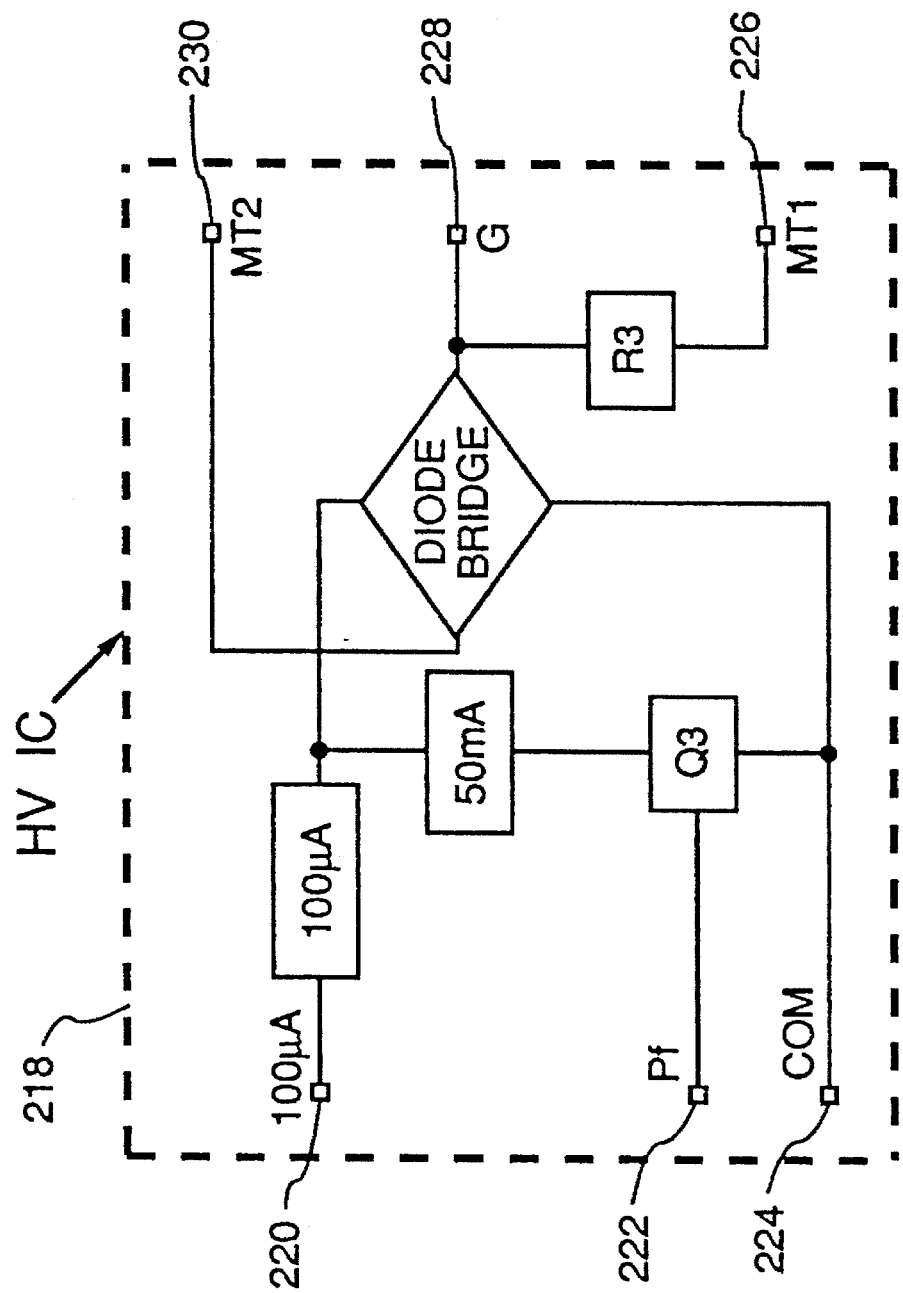
FIG. 7 is a block diagram showing the principal components of the HV circuitry of FIG. 4.

Unlike conventional TRIAC firing schemes, the circuit does not deliver the charge on Cf 215 (FIG.4) to the TRIAC 232 (FIG. 4). Instead, the DIAC 256 produces a constant width pulse at terminal 216 that turns ON the high-voltage switch (Q3) in the HV circuit (FIGS. 7 and 7a) via the terminals 216 and 222. As will be noted below with respect to FIG. 7, the switch Q3 delivers the HV circuit's 50 Ma constant current to the TRIAC until the TRIAC turns ON.

As indicated previously, the circuit may optionally include a digital counter 221 (FIG. 4) which responds to outputs from the current steering component 240, counts up to a predetermined setting and then generates an output which is applied to the slow-start timer 252 to disable the output thereof and thus cause TRIAC 232 (FIG. 4) to block current flow to the light bulb. Such a feature has the benefit of providing light level responsive light bulb turn ON, but timed turn OFF. For example, it might be desirable to have a particular lamp turn ON at dusk and then turn OFF at some predetermined time after turn-ON. This would result in substantial energy savings as compared to leaving the light ON until daylight turns it OFF.

Figure 6:
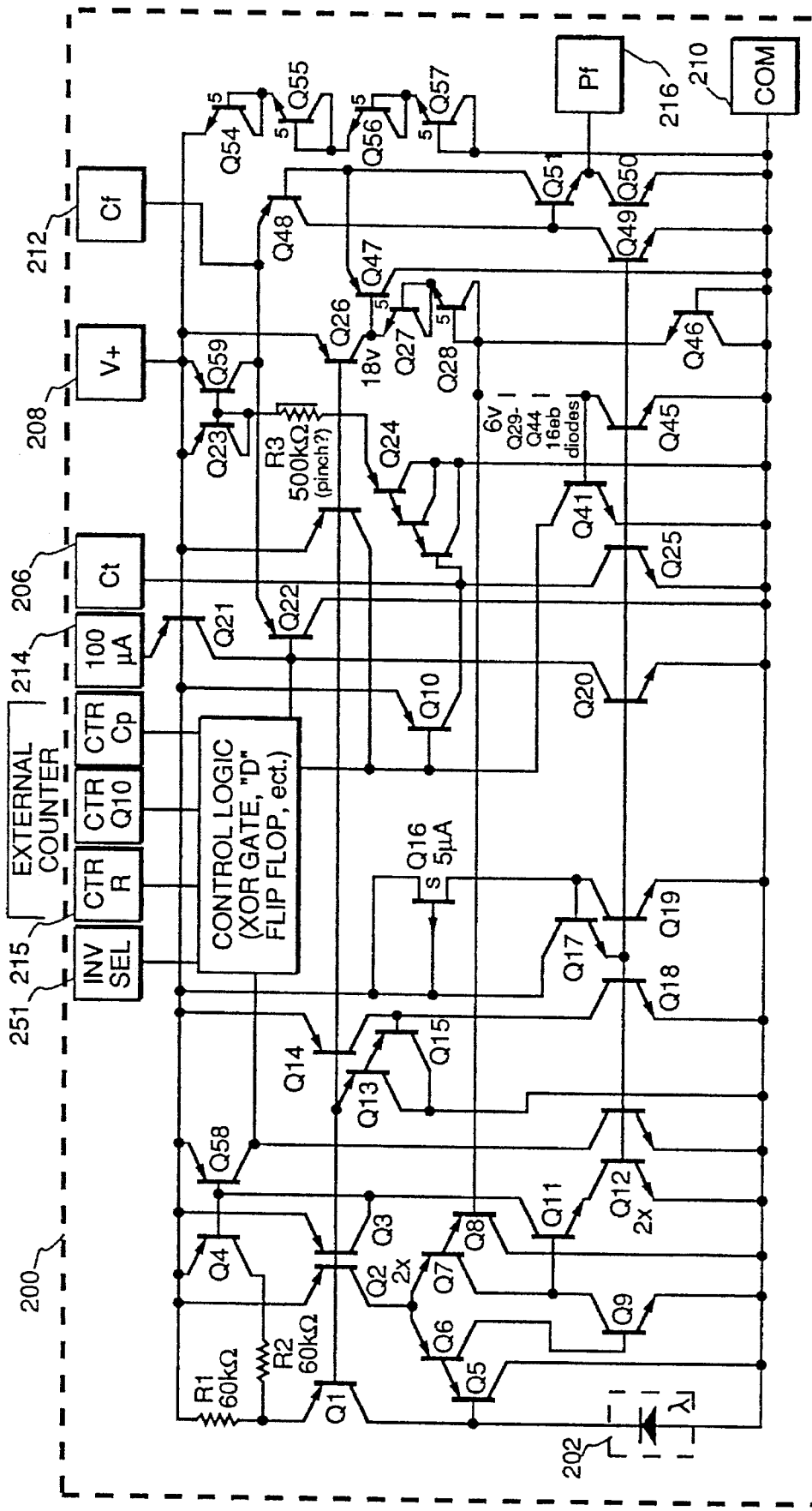
FIG. 6 shows a detailed schematic of the LV circuit of FIGS. 4 and 5.

FIG. 6 provides a still more detailed showing of the LV circuitry, illustrating one possible implementation at the transistor level.

The photodiode 202 must be rectangular and nearly 150 mils long to match the shape of the light-conducting ribbon or cable 14. Chip scribe-and-break considerations typically require that the other chip dimension must be 100 mils or so, yet the width of the photodiode need be no more than 20 mils. These considerations assure plenty of room for the other circuitry, even with the large feature size resulting from the thick epi layer required for photodiode sensitivity.

JFET Q16 provides the master current value, 5uA, for biasing the current mirrors. The combination of Q17 and Q19 bias the NPN mirror string comprising Q12, Q18, Q20, Q25, Q45, Q49 and Q50. Q13–15 control the reflected PNP mirrors Q1, Q2, Q3 and Q26.

The photodiode reference currents I1 241 and I2 243 are provided by Q1 and resistors R1 and R2, as "degenerated mirrors". Thus these reference currents for the photodiode can be far smaller than the standard 5uA mirror value.

The Comparator and Hysteretic Feedback functions are accomplished as follows: Transistors Q5–9 and bias transistor Q2 make up the first stage of amplifier 245. Q11 and its load, Q3, are the second stage, for which Q12 sets a current limit of 10uA. Amplifier 245's output drives both Q4 and Q58. Q4 switches R2, providing the light level hysteresis function. Q58 drives one input of an exclusive-OR gate in the control logic. The control logic output drive Q10 which holds the voltage on Ct at the chip's power-supply voltage, disabling the slow-start timing function whenever it is ON.

A voltage reference is provided by Q26 which provides constant current to series-connected reverse-emitter-base diodes Q27, Q28 and Q46, developing about 6 Volts per diode for the 6 and 18 Volt references the system requires. The temperature coefficient of the 6 volt reference is about +2 mV/deg C.

Temperature sensing is provided as follows: Q45 biases the forward biased emitter-base diode string Q29–44 at 5uA.

The forward emitter-base voltage of Q41 and the string have a combined temperature coefficient in the vicinity of −32mV/deg C. At a temperature determined by the process, the string voltage will be less than that of the 6 volt reference by enough to bring the collector current of Q41 to the micro amp range. Q41 forms a "wired-OR" gate with Q10, so the slow-start timing function is locked out above that temperature. The circuit performs a crude temperature detection function using a method that predates the Widlar band-gap reference circuit and its derived temperature sensor (although the Widlar circuit could also be used).

The Slow-start Timer function operates as follows: When Q10 turns OFF, to begin a period of light-ON operation, the current from mirror transistor Q25 charges Ct, ramping the capacitor's voltage slowly in a negative direction. Triple Darlington Q24 and resistor R3 provide a current to the mirror formed by Q23 and Q59 that is roughly proportional to the ramp voltage, and therefore to time, since the slow start timer began its cycle either upon power up or when the starting logic conditions are satisfied. The slowly ramping current charges firing phase capacitor Cf, but at every AC line zero crossing the voltage on current-steering transistor Q21 falls to zero, and Q22 resets the voltage on Cf almost to zero. So the fast ramp on Cf restarts after every zero crossing. The fast ramp's rate of rise depends on the voltage on Ct, which decreases during the slow start cycle.

Pulse formation is accomplished as follows: When the voltage on Cf reaches about 19 volts, Q48 turns ON-because its base connects to the emitter of Darlington Q47, whose base connects to the 18 volt reference. When Q48's collector current exceeds the mirror current of Q49, Q51 begins to turn ON. Since its collector feeds back to the base of Q48, this is regenerative, and Q48 and Q51 quickly drive each other to saturation. That causes the emitter of Q51 to rise quickly to about 18 Volts, producing the positive pulse to drive the MOSFET high-voltage switch in the HV circuit, in turn driving the TRIAC's gate. The pulse normally lasts until the TRIAC fires, which collapses the voltage across the HV circuit. Not only does the pulse end, but current in Q21 ceases and Q22 resets Cf just as if a zero crossing had occurred. This situation persists until the TRIAC turns itself OFF at the zero crossing. At that time, the phase control sequence begins again.

Reverse emitter-base diodes Q54–Q57 act as a "Zener clamp" to limit the voltage across the LV circuit to about 24 volts. The power supply capacitor, Cp, holds the LV circuit's operating bias up during zero crossings and after the TRIAC fires. Without this capacitor, the circuit could not "remember" its slow-start timing or photo current hysteresis from one half cycle of the line voltage to the next.

Figure 7A:
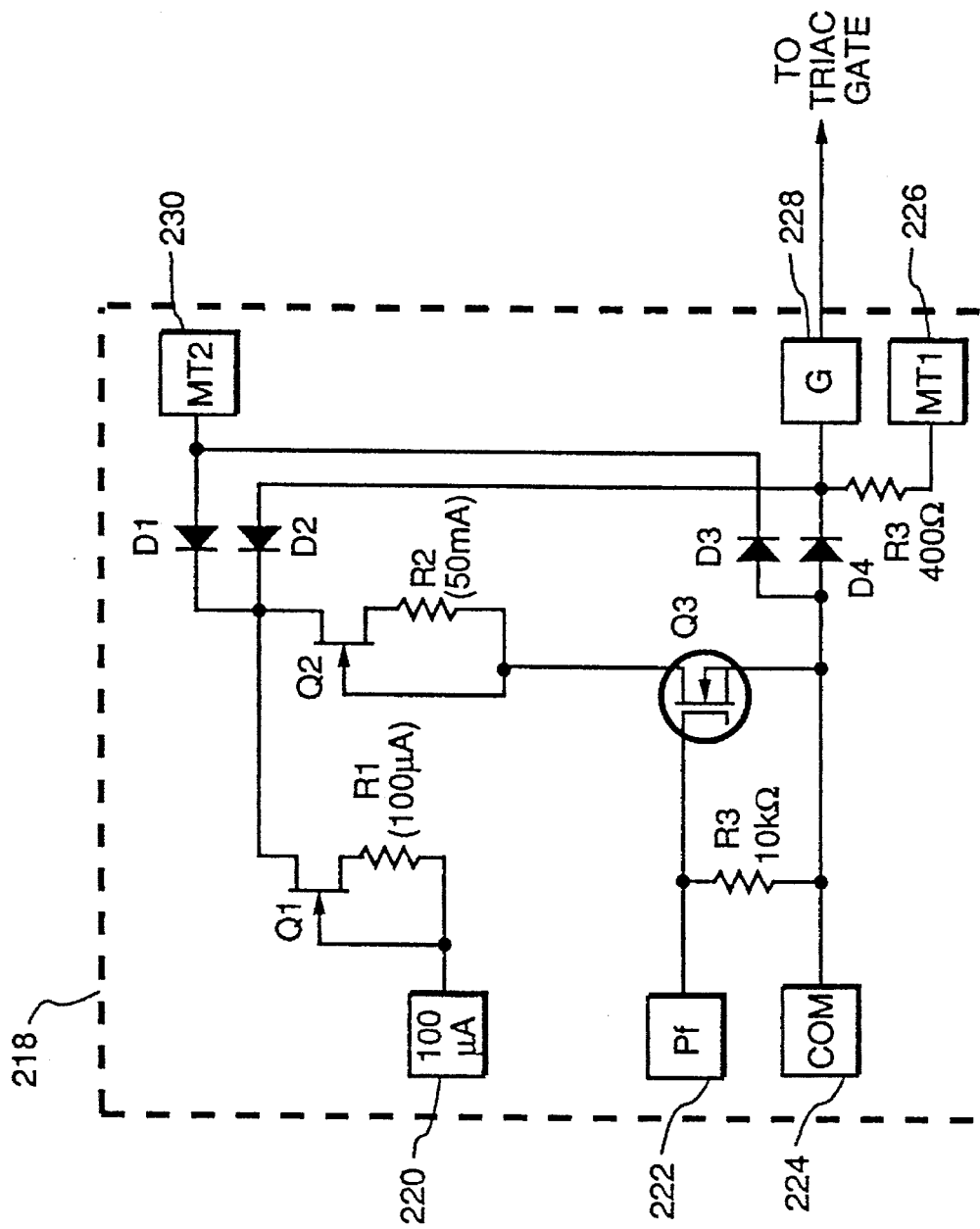
FIG. 7a is a schematic diagram showing the principal components of the HV circuit of FIGS. 4 and 7.

In FIG. 7a, further details of the HV circuit 218 are depicted. Diodes D1–D4 make up a full-wave bridge rectifier that produces unidirectional current flow in all circuitry to the left of the four diodes when voltage of either polarity exists between the bonding pads 230 and 228 (labeled MT2 and G), which connect to the TRIAC's MT2 and gate terminals, respectively.

A junction field effect transistor, Q1, and resistor R1 form a constant-current source nominally producing 100 uA. Q1 provides quiescent operating current to the LV circuit via terminal 220, as well as line-voltage zero-crossing information.

Q2 and R2 form another constant current source, this one producing approximately 50 Ma. MOSFET Q3 normally blocks this current. To fire the TRIAC, the LV circuit turns ON Q3, which in turn conducts the 50 Ma current to the TRIAC's gate via terminal 228.

One more terminal, labeled MT1, connects resistor R3 to provide a shunt path between the TRIAC gate and the MT1 terminal 226. R3 diverts the 100 Ua operating current of the LV circuit so that it will not fire the TRIAC, but it does not shunt a significant fraction of the 50 Ma current of the TRIAC firing pulse. It thus prevents "falsing" on operating bias, but allows the TRIAC to fire when required.

The HV circuit requires a dielectric isolated fabrication process with drain to source breakdown voltage of at least 250 Volts (for domestic applications —500 V for foreign). However, Q3 could alternately be a bipolar Darlington, depending on the fabrication process used. Also, the constant-current sources need not be JFETs. Any structure compatible with the process that produces a stable 250-Volt-compliance, constant-current source will do, including those based on bipolar transistors.

The present invention has been characterized above as a means for closing an electrical circuit in response to a "low" level of ambient or other input light and opening the circuit either after a predetermined time or in response to a predetermined "high" level of light. It is to be understood, however, that the device could likewise be configured to operate in the opposite mode so as to complete an electrical circuit in the presence of light and open the circuit in the absence of sufficient light.

For example, one might wish to use a device of the latter type on a light fixture positioned above or next to his garage door so that at night, as his car approaches the garage, light from the car's head lamps is sensed by the device and the light fixture turns ON. In this example, a directionally selective light-admitting shroud would be required to limit the amount of daylight entering the light-conducting ribbon but providing a direct and unobstructed path to the lens for the light from the head lamps of an arriving vehicle.

One simple embodiment of this type is illustrated in FIG. 8 and includes a frusto-conically shaped light coupling condenser 260 and an elongated tubular shroud 262. The condenser 260 is made of a suitable, efficient, light-conducting material and has a flat front face 264, a polished and conically tapered outer surface 266, and a conically shaped and surface-polished bore 268 coaxial with the body 260. The annular apex end surface 270 surrounding the bore 268 is flat and polished and serves as a connecting interface to the light-receiving end of the ribbon 14. Note that the end portion of ribbon 14 is rolled at 272 to conform to the annular surface 270 and is affixed thereto with a suitable optical cement. The junction is supported and strengthened by a band 274. In addition, a cylindrical pin 275 having a conically tapered end may be used as a means about which the ribbon end portion may be bound. The pin will also serve as an alignment means for aligning the end surface of the ribbon with the annular apex end surface of the condenser 260 as the tapered end of the pin mates with the conical bore 268.

The cone angles of surfaces 260 and 268 are chosen so that substantially all of the light entering the condenser 260 through the face 264 and striking the conical surfaces is reflected into the end of the ribbon 14. The surfaces 266 and 268 may also be coated to prevent the entry of unwanted light and to enhance the internal reflectivity.

The interior surface 276 of shroud 262 is typically blackened to prevent internal reflection, and the length of the type is chosen to fit the particular application. More specifically, by selecting an appropriate length for the tube 262, only light from a particular direction will be admitted through the condenser to the ribbon for conduct to the associated switching device.

Alternatively, the shroud 262 and condenser 260 can be used as a coupling interface for connecting the device of the present invention to a long fiber optics cable to permit remote operation thereof. Furthermore by fashioning the condenser to have a hemi-spherical or convex base, light from a broad field can be collected as shown in FIG. 8a.

Figure 9:
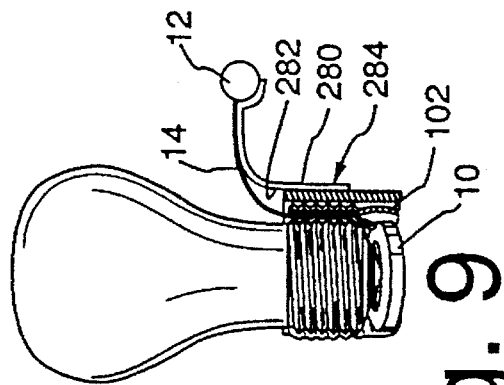
FIG. 9 illustrates an embodiment of the present invention including means for supporting the light conducting cable and lens.

In FIG. 9 an addition to the device of FIGS. 1 and 2 is illustrated to provide support for the ribbon 14 and lens 12. According to this embodiment, a deformable strip of soft metal or plastic 280 is affixed to the ribbon 14 with a tacky adhesive 282 so that, prior to installation of the disk 10 into the socket 102, the lower portion of the strip can be peeled away from the ribbon, suitable deformed and positioned outside the socket and then secured to the outer surface of the socket by the adhesive, as illustrated at 284. The lens 12 can then be directed as desired by bending the metal strip as needed. The strip will then serve to retain the lens in the selected orientation and position.

Devices in accordance with the present invention may be made to suit any size or type of light socket, and with appropriate circuit modifications be adapted for use in DC-powered systems, for example to turn vehicle lights ON and OFF as a function of input or ambient light.

Although this invention has been described in terms of preferred embodiments, it will be appreciated that various alterations and modifications thereof may become apparent to those of ordinary skill in the art. For example, although the switching unit is depicted as being circular in configuration with the electronic components dispersed around the perimeter, it will be appreciated that other configurations could likewise be used, for instance placing all of the circuit components on one side of the center contact pads or even on both sides of the circuit board. It is therefore intended that the appended claims cover all such alterations and modifications as fall within the true spirit and scope of the invention.

What is claimed is:

1. A light-sensing switching device for use in a socket into which a light bulb having a center contact and a conductive sleeve may be installed, the socket having a generally cylindrical, conductive wall forming an electrical contact for engaging the cylindrical, conductive sleeve of a light bulb, and a socket contact disposed within the socket and aligned for engagement with the light bulb center contact, comprising:

a thin switching unit adapted for disposition within a socket and including a light-responsive switching circuit having a first contact pad for engagement with the socket contact, and a second contact pad for engagement by the light bulb center contact of a bulb disposed in the socket;

a light-collecting means; and a length of light-conducting material having a first end communicatively connected to said light-responsive switching circuit, and a second end communicatively coupled to said light-collecting means, said light-conducting material being thin enough to pass between the bulb sleeve and socket wall such that, with the switching unit disposed within the socket and the light-collecting means disposed outside the socket, light collected by said light-collecting means is input to said second end of said length of light-conducting material and communicated through said material to said light-responsive switching circuit, said light-responsive switching circuit being responsive to a first level of light and operative to complete an electrically conductive path for electrical energy between the socket contact and the light bulb center contact causing the bulb to be turned ON, and in response to a second level of light operative to interrupt the electrically conductive path causing the bulb to be turned OFF.

2. A light-sensing switching device as recited in claim 1 wherein said switching unit includes:

an electronic, signal-responsive power switching element connected between said first contact pad and said second contact pad;

a low voltage subcircuit including photosensor means responsive to a predetermined level of light communicated thereto through said length of light-conducting material and operative to cause a switching signal proportional thereto to be generated by said low voltage subcircuit; and a high voltage subcircuit responsive to said switching signal and operative to develop a signal for causing said power switching element to conduct and complete the conductive path between said first and second contact pads.

3. A light-sensing switching device as recited in claim 2 wherein said switching signal alternates between a first state and a second state and wherein said low voltage subcircuit further includes a slow-start circuit means for causing the duty cycle of said switching signal to change from a low value to a high value during a predetermined initial portion of each lamp turn-ON operation.

4. A light-sensing switching device as recited in claim 3 wherein said power switching element is a TRIAC and said low voltage subcircuit includes a DIAC for coupling said switching signal to the control gate of said TRIAC.

5. A light-sensing switching device as recited in claim 4 wherein said high voltage subcircuit includes rectifier means for converting AC line current applied to the socket to direct current, and a semiconductor driver device responsive to said switching signal and operative to apply said direct current to the gate of said TRIAC to cause it to conduct.

6. A light-sensing switching device as recited in claim 1 wherein said light-collecting means is a cylindrical lens and said length of light-conducting material is of a flat ribbon configuration with said second end lying within a plane passing through and including the longitudinal axis of said cylindrical lens and being connected to the outside surface of one side of said cylindrical lens such that light from the opposite side is focused by the lens into said second end.

7. A light-sensing switching device as recited in claim 1 wherein said switching unit includes a printed circuit board having said first and second contact pads respectively formed on opposite sides and covering the center portions thereof, said circuit board having a plurality of electronic circuit elements forming said switching circuit disposed on at least one side of said printed circuit board at locations surrounding said contact pads.

8. A light-sensing switching device as recited in claim 2 wherein said switching unit further includes timing means responsive to said switching signal and operative to disable said switching unit after a predetermined time has elapsed following turn-ON of said power switching element.

9. A light-sensing switching device as recited in claim 6 wherein said switching unit includes:

an electronic, signal-responsive power switching element connected between said first contact pad and said second contact pad;

a low voltage subcircuit including photosensor means responsive to a predetermined level of light communicated thereto through said length of cable and light-conducting material operative to cause a switching signal proportional thereto to be generated by said low voltage subcircuit; and a high voltage subcircuit responsive to said switching signal and operative to develop a signal for causing said power switching element to conduct and complete the conductive path between said first and second contact pads.

10. A light-sensing switching device as recited in claim 9 wherein said power switching element is a TRIAC and said low voltage subcircuit includes a DIAC for coupling said switching signal to the control gate of said TRIAC.

11. A light-sensing switching device as recited in claim 10 wherein said high voltage subcircuit includes rectifier means for converting AC line current applied to the socket to direct current, and a semiconductor driver device responsive to said switching signal and operative to apply said direct current to the gate of said TRIAC to cause it to conduct.

12. A light-sensing switching device as recited in claim 11 wherein said switching signal alternates between a first state and a second state and wherein said low voltage subcircuit further includes a slow-start circuit means for causing the duty cycle of said switching signal to change from a low value to a high value during a predetermined initial portion of each lamp turn-ON operation.

13. A light-sensing switching device as recited in claim 12 wherein said switching unit further includes timing means responsive to said switching signal and operative to disable said switching unit after a predetermined time has elapsed following turn-ON of said power switching element.

14. A light-sensing switching device as recited in claim 13 wherein said switching unit includes a circuit board having said first and second contact pads respectively formed on opposite sides and covering the center portions thereof, said circuit board having a plurality of electronic circuit elements forming said switching circuit disposed on at least one side of said circuit board at locations around said contact pads.

15. A light-sensing switching device as recited in claim 5 wherein said length of light-conducting material is of a flat ribbon configuration and said light-collecting means is an optical lens adapted to direct outside light through said second end and into said length of light-conducting material.

16. A light-sensing switching device as recited in claim 2 wherein said switching unit includes a circuit board having said first and second contact pads respectively formed on opposite sides and covering the center portions thereof, said circuit board having a plurality of electronic circuit elements forming said switching circuit disposed on at least one side of said circuit board at locations surrounding said contact pads.

17. A light-sensing switching device for use in a lamp including a socket into which a light bulb may be installed, the socket having a threaded, generally cylindrical, conductive inner side wall forming an electrical contact for engaging the outer cylindrical, conductive sleeve of a light bulb, and an electrical contact centrally disposed within the bottom of the socket and aligned for engagement with the center contact of the light bulb, comprising:

a generally disk-shaped switching unit adapted for disposition within a lamp socket and including a light-responsive switching circuit having a first contact pad for engagement with the centrally disposed socket contact, and a second contact pad for engagement by the center contact of a light bulb disposed in the socket;

a light-collecting lens means; and a length of light-conducting ribbon having one end communicatively connected to said switching unit, and a second end communicatively coupled to said lens means, said ribbon being thin and flexible enough to pass between the bulb sleeve and socket wall such that, with the switching unit disposed within the socket and the lens means disposed outside the socket, light collected by said lens means is input to said second end of said ribbon and communicated through said ribbon to said switching unit, said light-responsive switching circuit being actuated in response to a first level of light and operative to complete an electrically conductive path between the central socket contact and the center contact of the bulb causing the bulb to be turned ON, and in response to a second level of light, to interrupt the electrically conductive path causing the bulb to be turned OFF.

18. A light-sensing switching device as recited in claim 17 wherein said switching unit further includes timing means responsive to actuation of said switching unit and operative to disable said switching unit after a predetermined time has elapsed following actuation of said switching unit.

19. A light-sensing switching device as recited in claim 18 wherein said lens means is directionally selective and only admits light from a particular direction to said ribbon.

20. A light-sensing switching device as recited in claim 17 and further comprising a deformable strip affixed to said ribbon and adapted to be partially separated from the ribbon and affixed to the socket to provide support for said lens means and said ribbon.

21. A light-sensing switching device as recited in claim 17 wherein said lens means includes an adjustable shade for blocking a selected portion of the incoming light path, thereby permitting an operational light threshold of the device to be selected.

22. A light responsive switching device for use in a socket into which a light bulb may be installed, the socket having a first electrical contact for engaging the outer conductive sleeve of a light bulb, and a second electrical contact disposed within the socket and aligned for engagement with the primary contact of the light bulb, comprising:

a switching unit adapted for disposition within the socket and including a light-responsive switching circuit having a first contact pad for engagement with the second socket contact, and a second contact pad for engagement by the primary bulb contact of a light bulb disposed in the socket, said light-responsive switching circuit including:

an electronic, signal-responsive power switching element connected between said first contact pad and said second contact pad;

a low voltage subcircuit including photosensor means responsive to a predetermined level of light communicated thereto and operative to cause a switching signal proportional thereto to be generated by said low voltage subcircuit; and a high voltage subcircuit responsive to said switching signal and operative to develop a signal for causing said power switching element to conduct and complete an electrically conductive path between said first and second contact pads;

a light-collecting means; and a length of light-conducting material having one end communicatively connected to said photosensor means, and a second end communicatively coupled to said light-collecting means, said length of light-conducting material being thin enough to pass between the bulb sleeve and socket wall such that, with the switching unit disposed within the socket and the light-collecting means disposed outside the socket, light collected by said light-collecting means is input to said second end of said length of light-conducting material and communicated therethrough to said photosensor means, said photosensor means being responsive to a first level of light and operative to cause said light-responsive switching circuit to complete an electrically conductive path between the second socket contact and the primary contact of the bulb causing the bulb to be turned ON, and responsive to a second level of light to interrupt the electrically conductive path causing the bulb to be turned OFF.

23. A light switching device as recited in claim 1, wherein said light conducting material is in the form of an elongated ribbon having said second end rolled about a longitudinal axis to form an annular end surface, and wherein said light collecting means includes a transparent light conducting, right frustum shaped body having a cone shaped bore extending coaxially into the apex end thereof, the base end of the bore and the apex end of the frustum defining an annular apex end surface having a predetermined radial width, said body and said bore having cone angles selected such that light entering the base end of the body and directed substantially parallel to the longitudinal axis thereof will be substantially totally reflected by the frusto-conical outer surface of the body and the conical inner surface formed by the bore and will be directed through said annular apex end surface, whereby light exiting said annular apex end surface is coupled into said ribbon through its annular end surface.

24. A light sensing switching device as recited in claim 23, and further comprising an elongated pin having a cylindrical body portion terminating at one end in a conically configured end portion, said second end of said ribbon being wrapped about said cylindrical body portion, and said conically configured end portion being extended into said bore so as to align said annular end surface of said ribbon with said annular apex end surface of said body.

25. A light sensing switching device as recited in claim 24, and further comprising an elongated tubular hood means open at one end and having the other end thereof coaxially receiving said base end of said frustum shaped body, said hood means serving to limit the direction from which light may enter the base of said frustum shaped body.

26. A light sensing switching device as recited in claim 25, wherein said hood means further serves as a coupling means for coupling one end of a cylindrical fiber optics light conducting means to the base of said frustum shaped body.

27. A light sensing switching device as recited in claim 2, wherein said low voltage subcircuit further includes for providing a hysteresis effect reducing the first level of light required to cause said light-responsive switching circuit to turn the bulb on once the light intensity has increased to a level sufficient to cause the light-responsive switch circuit to turn the bulb off, thereby eliminating flicker during the on and off transitions.

28. A light sensing switching device as recited in claim 3, wherein said low voltage subcircuit further includes over temperature sensing means for preventing the slow start circuit means from beginning its operation whenever the light collected by said light collecting means exceeds a predetermined limit or when the circuit temperature exceeds a predetermined limit.

* * * * *